United States Patent [19]

van der Smissen

[11] Patent Number: 5,113,856
[45] Date of Patent: May 19, 1992

[54] IMPREGNATION FOR RESPIRATOR FILTERS FILLED WITH ACTIVE CARBON

[75] Inventor: Carl E. van der Smissen, Lübeck, Fed. Rep. of Germany

[73] Assignee: Drägerwerk Aktiengesellschaft, Lübeck, Fed. Rep. of Germany

[21] Appl. No.: 680,909

[22] Filed: Apr. 4, 1991

[30] Foreign Application Priority Data

Apr. 6, 1990 [DE] Fed. Rep. of Germany ....... 4011221

[51] Int. Cl.⁵ .................................................. A62B 7/10
[52] U.S. Cl. ............................ 128/205.27; 128/205.28
[58] Field of Search ..................... 128/205.27, 205.28, 128/205.12, 201.25, 202.26

[56] References Cited

U.S. PATENT DOCUMENTS 4,997,803  3/1991  van der Smissen et al. ... 128/205.28

FOREIGN PATENT DOCUMENTS

3805407A1  8/1989  Fed. Rep. of Germany .

Primary Examiner—Edgar S. Burr
Assistant Examiner—Aaron J. Lewis
Attorney, Agent, or Firm—McGlew & Tuttle

[57] ABSTRACT

An impregnation for respirator filters, filled with active carbon, containing at least two of the known vanadium, copper, manganese, and zinc compounds, which occur as the vanadate, oxide, carbonate, or chloride, with addition of an oxo acid, shall be improved such that the stability of the respirator filters during storage will be improved. To accomplish this task, tungstic acid, molybdic acid, permanganic acid, stannic acid, or phosphoric acid is added.

3 Claims, No Drawings

IMPREGNATION FOR RESPIRATOR FILTERS FILLED WITH ACTIVE CARBON

FIELD OF THE INVENTION

The present invention pertains to an impregnation for respirator filters filled with active carbon containing at least two of the following components: vanadium, copper, manganese, and zinc compounds, which occur as the vanadate, oxide, carbonate, or chloride, and an oxo acid as an additive.

BACKGROUND OF THE INVENTION

Sorbent masses for the chemical binding of harmful gases have become known from West German Offenlegungsschrift No. DE-OS 38,05,407. They are used to clean the breathing air in different ways and are used, e.g., in respirator filters carried by persons or in filters of ventilation systems. These sorbent masses consist, e.g., of active carbon acting as the carrier, which is provided with an impregnation consisting of copper oxide and alkali chromate.

In addition, the impregnation may also contain zinc compounds in the form of zinc oxide. Sorbent masses containing vanadates instead of chromates are also known. If, for example, copper carbonate and alkali vanadate are applied together to active carbon and cautiously heated, the copper carbonate is completely or partially decomposed, and a highly effective impregnation for binding acidic gases is formed. Instead of copper carbonate, it is also possible to use copper oxide or zinc oxide, which lead to the formation of copper oxide-alkali vanadate, and zinc oxide-alkali vanadate impregnations, respectively. To expand the scope of application of the sorbent mass to the binding of ammonia, it is also possible to add zinc chloride.

Such an impregnated filter meets the performance specifications of DIN 3181 for type B filters against acidic gases and type K filters against ammonia.

The prior-art sorbent masses have the disadvantage that chromium containing impregnations reduce the stability during storage and therefore must be overdimensioned in order have sufficient protective effect even after storage. This makes the filters bulky, which is disadvantageous especially in the case of escape devices.

SUMMARY AND OBJECTS OF THE INVENTION

It is an object of the present invention to improve the storage stability of the respirator filters.

To accomplish this task, the additive is in the form of tungstic acid, molybdic acid, permanganic acid, stannic acid, or phosphoric acid.

Impregnations in that one of the vanadium, copper, manganese and zinc compounds is a chloride bromide, or iodide and impregnations in which iron compounds are present as a further additive in the form of the chloride, bromide, or iodide, bring about a considerable increase in the protective capacity against ammonia.

The effectiveness of the impregnation can be adapted to the specific needs, and the protective performance can be adapted to certain gases by using oxo acids in different ways.

DETAILED DESCRIPTION OF THE INVENTION

The invention provides an impregnation for respirator filters, filled with active carbon, containing at least two of the known vanadium, copper, manganese, and zinc compounds, which occur as the vanadate, oxide, carbonate, or chloride, with addition of an oxo acid, such that the stability of the respirator filters during storage will be improved. To accomplish this task tungstic acid, molybdic acid, permanganic acid, stannic acid, or phosphoric acid is added.

The production of sorbent masses according to the present invention will be explained in two examples:

EXAMPLE 1

1 kg active carbon is dried in a vacuum tumbling drier at 60° C. An ammoniacal solution of 80 g basic copper carbonate and 60 g sodium tungstate is subsequently sprayed onto the carbon under an internal pressure of 100 mbar in the tumbling drier. The temperature of the tumbling drier is raised to 100° C. 30 minutes after the end of spraying, and the internal pressure is reduced to 10 mbar. The carbon is circulated in the tumbling drier for 60 more minutes under these conditions. The temperature is subsequently raised to 140° C., with the vacuum pump running at full capacity, until the odor of ammonia ceases to be detectable in the waste air. After cooling of room temperature, the impregnated active carbon can be used to fill type B respirator filters according to DIN 3181. A filter of usual size, thus filled, has good absorption capacity for chlorine. If increased protective ability against sulfur dioxide is to be achieved, the carbon can be re-moistened to a water content of 15 wt.% after cooling in the tumbling drier.

EXAMPLE 2

1 kg active carbon is dried in a tumbling vacuum drier at 60° C. An ammoniacal solution of 40 g basic copper carbonate, 40 g zinc carbonate, and 50 g sodium molybdate is subsequently sprayed onto the carbon under an internal pressure of 100 mbar in the tumbling drier. The further processing is carried out as described in Example 1. A filter of usual size, thus filled, has good absorption capacity for hydrocyanic acid and cyanogen chloride, and meets all the performance specifications of DIN 3181 for type B filters.

Impregnations according to Example 1 as well as Example 2 still have their initial sorption capacity even after storage for a rather long time.

While specific embodiments of the invention have been shown and described in detail to illustrate the application of the principles of the invention, it will be understood that the invention may be embodied otherwise without departing from such principles.

What is claimed is:

1. A sorbent mass for the chemical binding of harmful gases, said sorbent mass including active carbon as a carrier, an impregnation of said sorbent mass comprising at least two components from at least one of a group vanadium, copper, manganese, and zinc compounds, which occur as the vanadate, an oxide, a carbonate, or a chloride; and, an oxo acid as an additive in the form of one of tungstic acid, molybdic acid, permanganic acid, stannic acid and phosphoric acid.

2. Impregnation according to claim 1, wherein one of the vanadium, copper, manganese, and zinc compounds is one of a chloride, bromide or iodide.

3. Impregnation according to claim 1, further comprising an iron compound as a further additive in the form of a chloride, bromide, or iodide.

* * * * *